United States Patent [19]

Himmler

[11] 4,310,892
[45] Jan. 12, 1982

[54] METHOD FOR DETERMINING IMBALANCE IN A MECHANICAL SYSTEM

[75] Inventor: Guenther Himmler, Darmstadt, Fed. Rep. of Germany

[73] Assignee: Gebrueder Hofmann GmbH & Co. K.G. Maschinenfabrik, Darmstadt, Fed. Rep. of Germany

[21] Appl. No.: 46,164

[22] Filed: Jun. 7, 1979

[30] Foreign Application Priority Data

Jun. 23, 1978 [DE] Fed. Rep. of Germany ....... 2827669

[51] Int. Cl.³ ..................... G01M 1/22; G06F 15/347
[52] U.S. Cl. .................................... 364/508; 73/462; 364/724
[58] Field of Search .................. 364/508, 724; 73/462

[56] References Cited

U.S. PATENT DOCUMENTS

| | | | |
|---|---|---|---|
| 3,938,394 | 2/1976 | Morrow et al. | 364/508 X |
| 4,010,637 | 3/1977 | Harwell et al. | 364/508 X |
| 4,015,480 | 4/1977 | Giers | 73/462 |
| 4,018,087 | 4/1977 | Wenz | 73/462 X |
| 4,162,634 | 7/1979 | Hofmann | 73/462 |
| 4,213,346 | 7/1980 | Polovnikov et al. | 364/508 X |

FOREIGN PATENT DOCUMENTS 555310  4/1977  U.S.S.R. ................ 73/462

OTHER PUBLICATIONS

Kalman-Bucy: New Results in Linear Filtering and Predichion Theory, *Journal of Basic Engineering*, Mar. 1961, (Transactions ef the ASME, pp. 95–108.

*Primary Examiner*—Felix D. Gruber
*Attorney, Agent, or Firm*—Fleit & Jacobson

[57] ABSTRACT

A method for determining imbalances in a mechanical system, such as a rotor, by detecting oscillations caused by the imbalances, selecting a useful signal having a particular amplitude and frequency from the detected signal, and filtering the useful signal so as to minimize errors contained in the useful signal, and providing a display which indicates the magnitude and phase displacement of the imbalance.

5 Claims, 2 Drawing Figures

METHOD FOR DETERMINING IMBALANCE IN A MECHANICAL SYSTEM

BACKGROUND OF THE INVENTION

The present invention relates in general to balancing and specifically to determining the magnitude and the phase position of oscillations detected by means of pickups. A useful signal, which is essentially composed of an amplitude and a frequency, is filtered out of the measured signal by frequency selection. The inventive method and apparatus are especially employed in techniques for the measurement of unbalances in rotors.

In rotor balance measuring techniques it is well known to filter the measured signal composed of an amplitude $A_n$ and a frequency sin ($n\omega t$), with $n\omega$ being the rotor frequency, out of a mixture of oscillations by means of various different selecting procedures. These selecting procedures include, for example, Fourier analysis, the wattmeter, Hall generators, phase-sensitive rectification, or even simple RC-filters.

All these procedures, however, do not permit obtaining the theoretically ideal selection, since unavoidable errors will occur. External oscillations are the source of most of the errors, which adversely influence the test result.

From an economic point of view, most of the time it cannot be justified to minimize or eliminate these small errors, which are classified as signal frequency errors.

Furthermore, these are also amplitude errors, which have been minimized up to now in the well-known measuring techniques simply by raising or tightening the tolerance limits.

Such errors, for example, comprise: crosstalk errors in plane separation; changes of sensitivity; centering errors of the machine; errors in the radii or the planes; as well as errors in the electronic measuring system.

Reduction of the class of frequency errors, by means of perfect filtering procedures, is as necessary and important as the tightening of the manufacturing tolerances; in both cases, however, an economically justifiable degree of accuracy should be achieved. Therefore, it is an object of the present invention to provide for optimum exploitation of information, during a data determination procedure of the above-mentioned kind, by making use of mathematical procedures which permit determination of the magnitude and the phase position of vibratory oscillations detected by pickups in a rotor-balancing operation.

BRIEF SUMMARY OF THE INVENTION

According to the present invention, this object is fulfilled in a balancing system of the above-mentioned kind by a specialized signal, i.e., a selected measuring signal, which is delivered to a probability optimum filter designed to transfer the signal into an optimum-state estimated rate, according to the rules of probability, with the aid of covariance matrices of the disturbance variables. The present invention considers the errors due to disturbances of the measuring system, by recognizing that these errors have Gauss-Markoff properties or similar characteristics, so that as a result of the transfer of the optimum-state estimate rate, in the form of a restored useful signal, the influence of the errors is reduced to a minimum.

The invention can be realized by making use of the rules of probability theory in conjunction with optimum prediction, with the information of the known disturbance variables being given as covariance matrices. In this manner the frequency and/or the amplitude of the measured values are restored, so as to minimize the influence of these errors.

In the probability optimum filter, the state estimate rate relating to the transfer behavior (transfer matrix) of the system, and the reaction of the system during transition from the deterministic stimulus vector, e.g. the unbalance vector, to the state vector, and the covariance of the estimation error relating to the covariance of the system error, which can be obtained from preceding measurements, can be extrapolated in separate chronological steps. Consequently, the resultant extrapolated estimate rate will be optimized by correcting with the aid of the filter gain. The steps of extrapolation and correction of the estimate rates are performed recursively.

The present invention provides for application of an optimum restoration, in form of the probability optimum filter, with the predicted state estimate rate being considered as a vector in the phase space, thus permitting a numerical solution in real time. A digital computer could be used to perform the necessary calculations.

The present invention can be advantageously used in rotor-balancing systems. The balancing machine is considered to be a dynamic system, replying to the input variable according to its transfer behavior, i.e., its transfer matrix A (t), with an output variable. This principle applies both to unbalance and to disturbances. Therefore, the instantaneous state of the system of the balancing machine can be described in a closed continuous form by equation (1) below.

$$\dot{x}(t) = A \cdot x(t) + B \cdot u(t) + D \cdot w(t) \tag{1}$$

x (t) = state vector
u (t) = deterministic stimulus vector (unbalance) A = - transfer matrix
B = control matrix, i.e., the reaction of u (t) x (t)
w (t) = disturbance vector
D = disturbance input matrix In a balancing system it is of great importance to measure the state of the system, thus drawing conclusions therefrom as to the unbalance. This means that a measurement y (t) is performed, which is affected by errors. The equation y (t) of measurement of the system is:

$$y(t) = C \cdot x(t) + v(t) \tag{2}$$

y (t) = measured vector
C' = matrix of measurement (of the electronic system)
v (t) = vector of the error in measurement The solution of equation (1) in the closed or general form, shall not be described here in detail, since it is extremely difficult and lengthy. The present invention, however, presents a technically realizable solution, which can be carried out by means of a digital computer, and which is termed a discrete solution of the system. The system is described by the equations (3) and (4) below, with the step size of the discrete scanning being k.

$$x(k+1) = A(k) \cdot x(k) + B(k) \cdot u(k) \tag{3}$$

$$y(k+1) = C(k+1) \cdot x(k+1) + v(k+1) \tag{4}$$

In equation (3), w has been assumed to equal zero, since only the useful real signal is to be computed.

The accompanying drawings show an example of the preferred embodiment of the invention, and a more detailed explanation of the invention follows.

DETAILED DESCRIPTION OF THE PREFERRED EMBODIMENT

Figure 1:
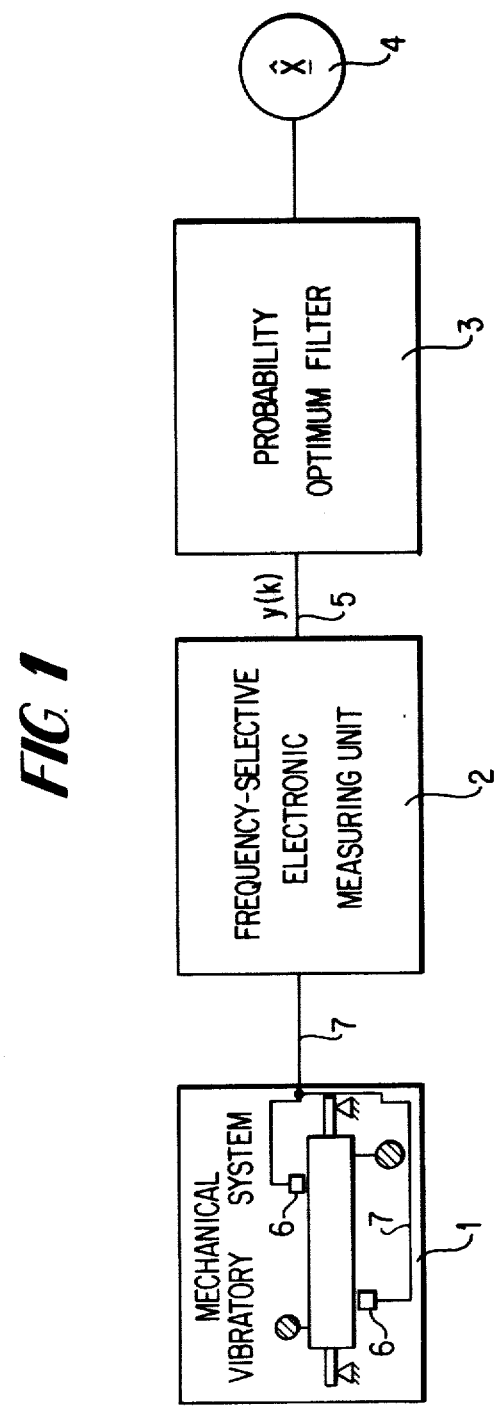
FIG. 1 is the diagrammatic representation of a block diagram of the complete arrangement of the measuring system as employed in a balancing system.

FIG. 1 shows a mechanical vibratory system 1 followed by a frequency-selective electronic measuring unit 2. Then the selective measured value y (k), available on the output 5 of the electronic measuring unit 2, is subsequently delivered to a probability optimum filter 3. The optimum estimated state vector $\hat{x}$ of the system is displayed on an appropriate display device 4.

The vibratory oscillations in the mechanical vibratory system are detected by pickups 6 and the detected signals fed to the measuring unit 2 on lines 7.

Analysis of the measured values obtained in the vibratory system 1 is affected with the error $\bar{x}$ (t), due to the disturbances and inaccuracies of the measurement.

This means that there exists an estimation error, in form of the difference $\bar{x}$ (k), occuring between the state value x (t) and the optimum estimated rate x (k) That is:

$$\bar{x}(k) = x(k) - \hat{x}(k)$$

Figure 2:
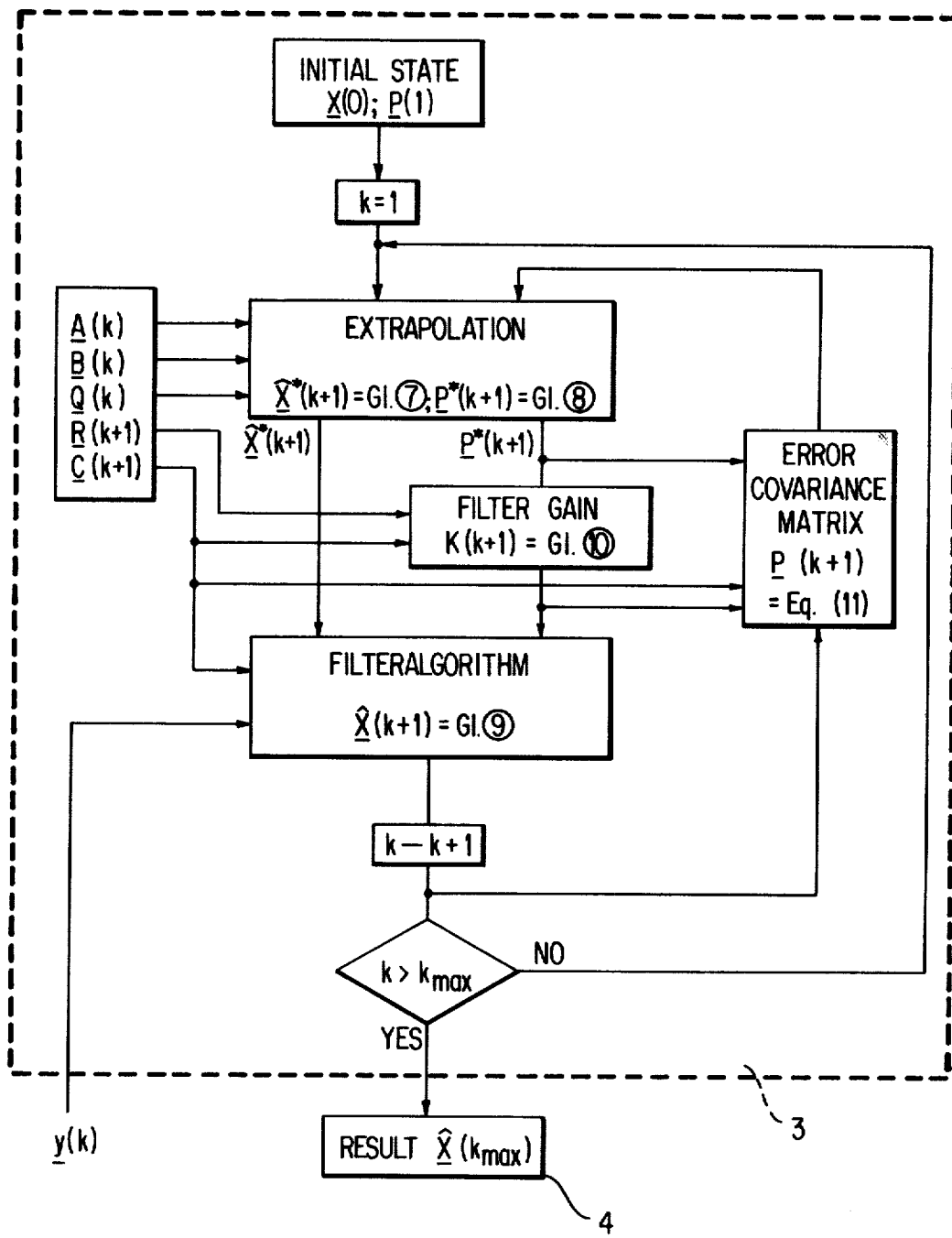
FIG. 2 represents a block diagram of the inventive probability optimum filter of FIG. 1.

The probability optimum filter 3 shown in FIG. 2 is designed to reduce x (k) to a minimum. This is all based on the realization that the error processes possess Gauss-Markoff characteristics, or similar procedures.

Since the unbalance has not been taken into consideration, the state value of the vibratory system is:

$$x(k+1) = A(k) \cdot x(k) + w(k) \tag{5}$$

and the measured value is:

$$y(k) = C(k) \cdot x(k) + v(k) \tag{6}$$

The anticipated value E of w and v is:

$$E\{w, w'\} = Q(k)$$

$$E\{v, v'\} = R(k)$$

and the covariance of the errors P (k) is:

$$P(k) = E\bar{x}, \bar{x}'$$

The optimum estimate value for x (k) immediately before the instant of measurement t (k) is denoted by $\hat{x}^*$ (k), the estimation error by $\bar{x}^*$ (k) = x (k) − $\hat{x}^*$, and the covariance $$P^*(k) = E\{\bar{x}^*k, \bar{x}^*k'\}.$$

A filter algorithm, along the lines of Kalman-Bucy, is employed in the probability optimum filter 3. During each measurement cycle the estimate state rate of the system x (k) is being corrected by the difference between the predicted value and the actually measured value in the intervals "k". In this manner, it is possible to obtain an improved estimate rate, which is optimized in respect to a minimum variance of the estimation error of the state vector. Extrapolation and correction of the estimate rate pass is always in the recursive operation of the filter, whereby it might occur that the initial values $x_0$ and $P_0$ are the first values measured.

The effect of the filter is to extrapolate from the state at the instant k to the state at the instant (k + 1), and to optimize subsequently the estimate rate x (k + 1) by correcting it with the filter gain K. Extrapolation of the estimate rate $\hat{x}$ (k) to $\hat{x}^*$ (k + 1), and of the covariance P (k) to $P^*$ (k + 1) is carried out according to the equations (7) and (8) below, with the transfer matrix A (k) and the control matrix B (k) being given, and the covariance of the process error Q being known from preceding measurements.

$$\hat{x}^*(k+1) = A(k) \cdot x(k) + B(k) \cdot u(k) \tag{7}$$

$$P^*(k+1) = A(k) \cdot P(k) \cdot A'(k) + Q(k) \tag{8}$$

After the measurements have been received with the measured value y (t), the filter gain matrix K (k + 1) and the covariance of the errors P (k + 1) are computed by means of equations (9) and (10) below, with the matrix of measurement C being given, and the covariance of the error in measurement R (k) being known from preceding measurements.

$$K(k+1) + P^*(k+1) \cdot C'(k+1)[C(k+1) \cdot P^*(k+1) \cdot C'(k+1) + R(k+1)]^{-1} \tag{9}$$

$$P(k+1) = [I - K(k+1) \cdot C(k+1) \cdot P^*(k+1)] \tag{10}$$

Consequently the corrected and restored estimate rate $\hat{x}$ (k + 1) can be computed by means of the equation (11).

$$\hat{x}(k+1) = \hat{x}^*(k+1) + K(k+1) \cdot [y(k+1) - C(k+1)\hat{x}^*(k+1)] \tag{11}$$

As seen in FIG. 2, after the number of recursive intervals has reached the preset limit, the optimum estimate rate x can be displayed on a suitable display means 4.

When this method is employed, the unbalance in form of the state vector can be determined optimally, thus reducing the spur of the covariance matrices to a minimum.

What is claimed is:

1. In a mechanical vibratory system having pickups which are connected via a measuring unit to a probability optimum filter, a method for determining the magnitude and phase position of oscillations caused by imbalance in the mechanical vibratory system, said method comprising the steps of:
    detecting oscillations by means of said pickups affixed to said system,
    converting said oscillations by means of said measuring unit to a measured signal containing errors due to disturbances in the measuring system,
    filtering said measured signal by means of said measuring unit so as to derive a selected signal having a known amplitude and frequency,
    deriving, from said measured signal, disturbance variables corresponding to said disturbances in the measuring system,
    providing covariance matrices of said disturbance variables to said probability optimum filter,
    converting said selected signal, in said probability optimum filter, into a probability optimum estimate rate of the state of said vibratory system, computing a corrected and restored selected signal having the effects of said errors due to disturbances in the measuring system minimized, and displaying the corrected and restored selected signal.

2. The method of claim 1, wherein the step of converting said selected signal, in said probability optimum filter, into a probability optimum estimate rate of the state of said vibratory system includes the further steps of:

considering a transfer matrix and the reaction of the system during transition from a deterministic unbalance vector to a state vector;

obtaining a covariance of the system error from preceding measurements;

extrapolating the covariance of the system error and the probability optimum estimate rate in separate chronological steps to develop an extrapolated estimate rate; and correcting and optimizing said extrapolated estimate rate by correcting with the aid of a filter gain.

3. The method of claim 2, comprising the further step of determining said filter gain from a covariance of measurement error and from the extrapolated covariance of the system error, and further in consideration of a measurement matrix.

4. A method according to any one of claims 2 or 3, wherein the extrapolating and correcting steps are performed recursively.

5. A method according to any one of claims 2, or 3 wherein the extrapolated estimate rates are corrected according to a predetermined algorithm based on the Kalman-Bucy theorem.

* * * * *